(12) United States Patent
Naunheim et al.

(10) Patent No.: US 8,882,452 B2
(45) Date of Patent: Nov. 11, 2014

(54) EXHAUST GAS TURBOCHARGER

(75) Inventors: Dirk Naunheim, Stuttgart-Vaihingen (DE); Anton Angelusch, Waiblingen (DE)

(73) Assignee: Mahle International GmbH (GB)

( * ) Notice: Subject to any disclaimer, the term of this patent is extended or adjusted under 35 U.S.C. 154(b) by 770 days.

(21) Appl. No.: 13/011,427

(22) Filed: Jan. 21, 2011

(65) Prior Publication Data

US 2011/0182714 A1 Jul. 28, 2011

(30) Foreign Application Priority Data

Jan. 23, 2010 (DE) .......................... 10 2010 005491

(51) Int. Cl.
  *F01B 25/02* (2006.01)
  *F01D 17/10* (2006.01)
  *F02C 6/12* (2006.01)
  *F02B 37/18* (2006.01)

(52) U.S. Cl.
  CPC ............ *F02B 37/186* (2013.01); *F01D 17/105* (2013.01); *Y02T 10/144* (2013.01); *F02C 6/12* (2013.01)
  USPC ........................................................ 415/163

(58) Field of Classification Search
  USPC ................... 415/150, 163, 164, 165
  See application file for complete search history.

(56) References Cited

U.S. PATENT DOCUMENTS

| 7,214,037 | B2* | 5/2007 | Mavrosakis | 417/407 |
| 7,340,895 | B2* | 3/2008 | Noelle | 60/602 |
| 2007/0051106 | A1* | 3/2007 | Jones | 60/602 |
| 2007/0071595 | A1* | 3/2007 | Mukherjee | 415/165 |
| 2008/0298953 | A1* | 12/2008 | Harris | 415/144 |

FOREIGN PATENT DOCUMENTS

EP 1635040 A1 3/2006

OTHER PUBLICATIONS

English abstract for EP-1635040.
German Search Report for GB-102010005491.7.

* cited by examiner

*Primary Examiner* — Edward Look
*Assistant Examiner* — Michael Sehn
(74) *Attorney, Agent, or Firm* — Rader, Fishman & Grauer PLLC

(57) ABSTRACT

An exhaust gas turbocharger includes a waste gate valve and an adjusting device for adjusting the waste gate valve. The adjusting device is connected to the waste gate valve and disposed on a housing of the exhaust gas turbocharger. The adjusting device is fastened to the housing of the exhaust gas turbocharger via an adjusting template.

11 Claims, 1 Drawing Sheet

EXHAUST GAS TURBOCHARGER

CROSS-REFERENCES TO RELATED APPLICATION

This application claims priority to German patent application DE 10 2010 005 491.7 filed on Jan. 23, 2010, which is hereby incorporated by reference in its entirety.

TECHNICAL FIELD

The present invention relates to an exhaust gas turbocharger for a combustion engine, particularly of a road vehicle, with the features of the preambles of the claims.

BACKGROUND

From U.S. Pat. No. 7,340,895 B2 a generic exhaust gas turbocharger is known, wherein an adjusting device, particularly a pressure box for adjusting a waste gate valve is screwed to a console of a housing of the exhaust gas turbocharger.

Disadvantageous with the known prior art is that upon replacement of the adjusting device, elaborate and thus expensive readjustment of the adjusting device to be newly attached is often required in order to guarantee its ease of operation and thus functional security.

SUMMARY

The present invention deals with the problem of stating an improved or at least an alternative embodiment for an exhaust gas turbocharger of the generic type, which is particularly characterized by high maintenance friendliness.

According to the invention, this problem is solved through the subject of the independent claims. Advantageous embodiments are the subject of the dependent claims.

With an exhaust gas turbocharger known per se for a combustion engine the present invention is based on the general idea of fastening an adjusting device for adjusting a waste gate valve or a variable turbine/compressor geometry to the housing of the exhaust gas turbocharger via an adjusting template. Such an adjusting template allows initial accurate setting of a position of the adjusting device relative to the waste gate valve or relative to the variable turbine/compressor geometry and subsequently reliable fixing of the adjusting device, so that upon replacement of the adjusting device no elaborate readjustment is required, but the new adjusting device can be merely inserted in and fastened to the already pre-oriented adjusting template. The adjusting template according to the invention in this case is designed in such a manner that it allows both translatoric as well as rotatoric orientation movements of the adjusting device relative to the housing of the exhaust gas turbocharger and because of this makes possible a particularly smooth adjusting movement of the waste gate valve or the variable turbine/compressor geometry. At the same time, the adjusting template makes possible a tolerance compensation in three axes (planes), as a result of which it is particularly easily possible to orient the adjusting device in such a manner that it can be accurately and smoothly connected to an adjusting lever of the waste gate valve or the variable turbine/compressor geometry.

The assembly of the exhaust gas turbocharger according to the invention in this case is effected for example as follows: initially, the adjusting template according to the invention is mounted to the housing of the exhaust gas turbocharger. Through twisting of a compressor housing and simultaneously displacing the adjusting template the exact position can be set for example through a gauge, wherein the adjusting template, for example by way of threaded pins, is subsequently screwed to the housing, particularly the compressor housing of the exhaust gas turbocharger in a fixed manner. This is then followed by the fixing of the adjusting device on the adjusting template. Through openings provided in the adjusting template, such as for example a central opening or through-openings through which the adjusting device reaches for example with an adjusting member or with threaded pins, a defined relative position between the adjusting template and the adjusting device is provided, so that the adjusting template, provided that it is accurately aligned, presets an accurate position for an adjusting device to be newly installed. Elaborate twisting or aligning of the compressor housing and thus readjusting is thus no longer required, as a result of which a maintenance of the exhaust gas turbocharger, particularly a replacement of the adjusting device can be significantly facilitated.

With an advantageous further development of the solution according to the invention the adjusting template is formed for example of plastic. On the one hand, an adjusting template produced of plastic in this manner is cost-effectively producible for example as plastic injection molding, on the other hand plastic possesses at least certain damping characteristics as a result of which vibration transmission from the exhaust gas turbocharger to the adjusting device is at least reduced. Obviously, forming the adjusting template of metal is also conceivable.

Further important features and advantages of the invention are obtained from the subclaims, from the drawings and from the corresponding figure description by means of the drawings.

It is to be understood that the features mentioned above and still to be explained in the following cannot only be used in the respective combination stated, but also in other combinations or by themselves without leaving the scope of the present invention.

Preferred exemplary embodiments of the invention are shown in the drawings and are explained in more detail in the following description, wherein same reference characters relate to same or similar or functionally same components.

BRIEF DESCRIPTION OF THE DRAWING

It shows, in each case schematically.

DETAILED DESCRIPTION

Figure 1:
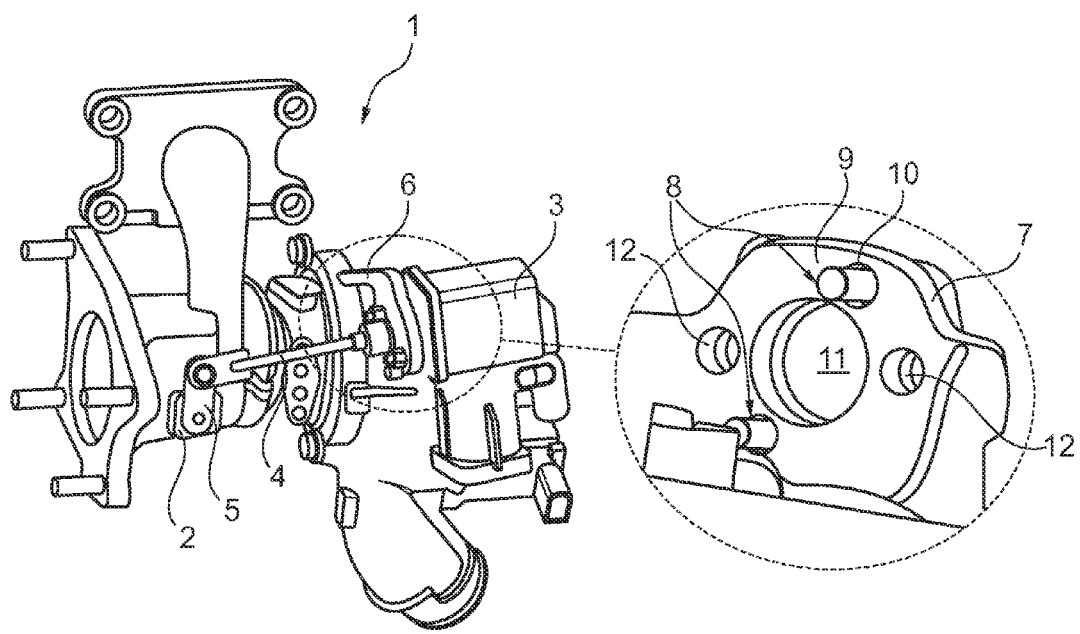
FIG. 1 an exhaust gas turbocharger according to the invention with an adjusting template in the connecting region of an adjusting device for a waste gate valve, FIG. 2 a possible embodiment of such an adjusting template.
Figure 2:
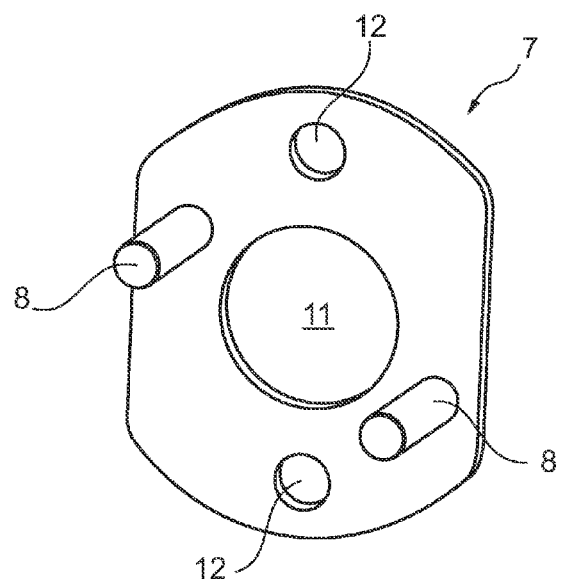

According to FIG. 1, an exhaust gas turbocharger 1 according to the invention for a combustion engine which is not shown, particularly of a road vehicle, comprises a waste gate valve 2 merely visible from the outside and an adjusting device 3 for adjusting the waste gate valve 2. Alternatively, the adjusting device 3 could also be utilized for adjusting a turbine/compressor geometry which is not shown. However, only the use for the first alternative is explained in more detail in the following, while it is clear that the second alternative can be similarly embodied. The adjusting device 3 in this case is connected to an adjusting lever 5 of the waste gate valve 2 in a jointed manner via an adjusting member 4 and arranged on a housing 6 of the exhaust gas turbocharger 1. For setting the correct position of the adjusting device 3 relative to the exhaust gas turbocharger 1 an adjusting template 7 (refer also FIG. 2) according to the invention is now provided, via which the adjusting device 3 is fastened to the housing 6 of the exhaust gas turbocharger.

For adjusting a correct relative position between the adjusting device 3 and the housing 6 of the exhaust gas turbocharger 1, the housing 6, which for example is embodied as compressor housing, is initially twisted and the adjusting template 7 displaced at the same time. The exact position of the adjusting template 7 can be predetermined for example by a gauge. As is more preferably evident from FIG. 2 the adjusting template 7, which for example is embodied as compensation plate, comprises at least two preferentially molded-on threaded pins 8, via which the adjusting template 7 is aligned relative to the housing 6 of the exhaust gas turbocharger 1 and fastened to the housing 6 by means of nuts. Here, the adjusting template 7 is not usually fastened directly to the housing 6 but rather to a console 9 which is molded on to the housing 6. The adjusting template 7 preferentially abuts this console 9 in a flat manner, wherein the console 9 comprises a number of bores 10 corresponding to the number of threaded pins 8, through which the threaded pins 8 in the installation state can reach and be screwed on at their free end. At the same time, the console 9 and the adjusting templates 7 have a central opening 11 substantially aligned in the installation state through which the adjusting device 3 reaches with its adjusting member 4 (refer FIG. 1). In addition, the console 9 and the adjusting template 7 comprise at least two through-openings 12 substantially aligned in the installation state through which the adjusting device 3 reaches with a corresponding number of threaded pins. The terms bore 10, central opening 11 and/or through-openings 12 merely serve to facilitate the distinguishability so that it is obviously clear that all of the through-openings can be embodied as bores.

With the adjusting template 7 according to the invention an alignment of the adjusting device 3 relative to the housing 6 of the exhaust gas turbocharger 1 once effected can thus be fixed so that upon a replacement of the adjusting device 3 the latter can be merely inserted through the adjusting template 7 still arranged on the console 9 and fastened to the latter without a complete re-alignment of the adjusting device 3, for example through twisting of the housing 6 or displacing of the adjusting template 7 being necessary. As a result of this, particularly the replacement of the adjusting device 3 can be significantly simplified as a result of which a maintenance effort can be reduced. The adjusting template 7 can for example be designed as plastic injection molding and as a result of this be produced cost-effectively and also easily modifiably.

The invention claimed is:

1. An exhaust gas turbocharger comprising:
   a waste gate valve and an adjusting device for adjusting the waste gate valve,
   wherein the adjusting device is connected to the waste gate valve and disposed on a housing of the exhaust gas turbocharger,
   wherein the adjusting device is fastened to the housing of the exhaust gas turbocharger via an adjusting template that is positioned between a console of the housing and the adjusting device, and is adjacent to the console, wherein the adjusting template includes at least two molded-on threaded pins via which the adjusting template is aligned with the housing and fastened to the housing
   and wherein the adjusting template and the console include at least two through-openings that are substantially aligned in an installation state through which the adjusting device reaches with a corresponding number of pins to facilitate replacement of the adjusting device.

2. The exhaust gas turbocharger according to claim 1, wherein the adjusting device is disposed on a compressor housing of the exhaust gas turbocharger.

3. The exhaust gas turbocharger according to claim 1, further comprising the console molded on the housing, which the adjusting template preferentially abuts in a flat manner and which includes a number of bores corresponding to the number of molded-on threaded pins through which the threaded pins reach in an installation state.

4. The exhaust gas turbocharger according to claim 3, wherein the console and the adjusting template include a central opening substantially aligned in the installation state, through which the adjusting device reaches with an adjusting member.

5. The exhaust gas turbocharger according to claim 3, wherein the adjusting template is formed of metal or of plastic.

6. The exhaust gas turbocharger according to claim 1, wherein the adjusting template is formed of metal or of plastic.

7. An exhaust gas turbocharger comprising:
   a valve for a variable turbine and an adjusting device for adjusting the variable turbine,
   wherein the adjusting device is connectable to the turbine and disposed on a housing of the exhaust gas turbocharger, and further wherein the adjusting device is fastened to the housing of the exhaust gas turbocharger via an adjusting template that is positioned between the housing and the adjusting device;
   wherein the adjusting template and the housing each include at least two through-openings substantially aligned with one another in an installation state through which the adjusting device reaches with a corresponding number of pins, and the adjusting template includes at least two molded-on threaded pins via which the adjusting template is aligned with the housing and fastened to the housing.

8. The exhaust gas turbocharger according to claim 7, wherein the adjusting device is disposed on a compressor housing of the exhaust gas turbocharger.

9. The exhaust gas turbocharger according to claim 7, further comprising a console molded on the housing, which the adjusting template preferentially abuts in a flat manner and which includes the two through-openings corresponding to the number of threaded pins through which the threaded pins reach in the installation state.

10. The exhaust gas turbocharger according to claim 9, wherein the console and the adjusting template include a central opening substantially aligned in the installation state, through which the adjusting device reaches with an adjusting member.

11. The exhaust gas turbocharger according to claim 7, wherein the adjusting template is formed of metal or of plastic.

* * * * *